United States Patent Office 3,458,534
Patented July 29, 1969

3,458,534
CO-PRODUCTION OF PHTHALIC ANHYDRIDE AND AN OXIRANE COMPOUND
Joseph L. Russell, Ridgewood, and Charles N. Winnick, Teaneck, N.J., assignors to Halcon International, Inc., a corporation of Delaware
No Drawing. Continuation-in-part of application Ser. No. 410,010, Nov. 9, 1964. This application Apr. 10, 1968, Ser. No. 720,371
Int. Cl. C07d 5/34
U.S. Cl. 260—346.4         8 Claims

ABSTRACT OF THE DISCLOSURE

The present invention is directed to a process for the co-production of phthalic anhydride and an oxirane compound. Specifically, the invention provides for the reaction of Tetralin hydroperoxide with an olefinically unsaturated material to produce an oxirane compound and alpha tetralol, and subsequent oxidation of the alpha tetralol to phthalic anhydride.

RELATED APPLICATION

This application is a continuation-in-part of parent application Ser. No. 410,010 filed Nov. 9, 1964, now abandoned.

BACKGROUND OF THE INVENTION

Both oxirane compounds and phthalic anhydride are very important and widely used chemicals of commerce. Although methods have been known in the art for the separate production of these materials, the art has not heretofore provided a process whereby both of these valuable commercial products could be produced by a particular sequence of interrelated reaction steps.

Methods have been known for the production of phthalic anhydride by the vapor phase oxidation of xylenes and naphthalene. Additionally, methods have been employed in the art for the production of oxirane compounds. However, nowhere has there been suggested an improved efficient process for the co-production of each of these components.

BRIEF SUMMARY OF THE INVENTION

In accordance with the present invention, Tetralin is oxidized with molecular oxygen in the liquid phase in order to provide an effluent which contains Tetralin alpha hydroperoxide. The hydroperoxide, in a second reaction step, is reacted with an olefin material under conditions which are effective to produce the oxirane derivatives of said olefin. At the same time, the Tetralin hydroperoxide is reduced to alpha hydroxy Tetralin (tetralol). The reaction mixture is then treated in order to separate various products. Normally, the oxirane compound is desired in highly pure form, and therefore, the reaction mixture is subjected to treatment as by distillation in order to separate the product oxirane compound. It is, however, to be understood that such separation is not always necessary since in some instances the oxirane compound can be employed in admixture with various of the other components of the reaction mixture.

The tetralol which is produced by reduction of the Tetralin hydroperoxide is then subjected to a reaction to produce a further advantageous product. In the most preferred practice of this invention, the tetralol is oxidized with molecular oxygen to produce phthalic anhydride. In another practice of the invention, the tetralol is dehydrogenated to the valuable chemical, alpha hydroxynaphthalene.

DETAILED DESCRIPTION

From the above brief overall description of the invention, it can be seen that there are certain very distinct advantages which are achieved through the present invention. In the first place, it is possible to form an important and valuable oxirane compound employing relatively inexpensive and available raw materials. However, not only is the oxirane compound formed by the inventive process, but also in forming this compound the other reaction component, Tetralin, is upgraded to a more valuable and useful material which itself has high utility in further reactions. For example, the oxirane step results in upgrading Tetralin to the more valuable tetralol. Tetralol is a considerably more valuable phthalic anhydride precursor than is Tetralin in that improved oxidation selectivities to phthalic anhydride are achieved with tetralol. Thus, it can be seen that the various steps of the present invention cooperate in the unique combination in order to attain unexpected advantageous end results.

The Tetralin is converted to Tetralin hydroperoxide in accordance with techniques which are of a generally known nature. Such techniques involve the liquid phase oxidation of Tetralin with a molecular oxygen containing gas. Air is the most advantageously employed as to source of molecular oxygen although mixtures of molecular oxygen with inert gas in greater or lesser concentrations than normally found in air can be used. Oxidation temperatures range generally from 70° C. to 160° C., a preferred range being 90° C. to 115° C. Sufficient pressure is maintained to provide for the Tetralin in the liquid phase. Illustrative pressures range from 0 to 500 p.s.i.g., a preferred range being 0 to 50 p.s.i.g. The Tetralin peroxidation is continued preferably until about 10 to 40% of the Tetralin has been reacted.

In the olefin epoxidation step, a catalyst is used.

The epoxidation catalysts include compounds of the following: Ti, V, Cr, Se, Zr, Nb, Mo, Te, Ta, W, Re, U. These may be characterized as forming peracids or as hydroxylation catalysts. By far, the preferred catalysts are compounds of V, W, Mo, Ti, Ta, Nb, Re, and Se.

The amount of metal in solution used as catalyst in the epoxidation process can be varied widely, although as a rule it is desirable to use at least about 0.00001 mol and preferably 0.002 to 0.03 mol per mol of hydroperoxide present. Amounts greater than about 0.1 mol seem to give no advantage over smaller amounts, although amounts up to 1 mol or more per mol of hydroperoxide can be employed. The catalysts remain dissolved in the reaction mixture throughout the process and can be re-used in the reaction after removal of the reaction products therefrom. The molybdenum compounds include the molybdenum organic salts, the oxides such as $Mo_2O_3$, $MoO_2$, $MoO_3$, molybdic acid, the molybdenum chlorides and oxychlorides, molybdenum fluoride, phosphate, sulfide, and the like. Hetero-polyacids containing molybdenum can be used as can salts thereof; examples include phosphomolybdic acid and the sodium and potassium salts thereof. Similar or analogous compounds of the other metals mentioned may be used as may mixtures thereof.

The catalytic components may be employed in the epoxidation reaction in the form of a compound or mixture which is initially soluble in the reaction medium. While solubility will, to some extent depend on the particular reaction medium employed, a suitably soluble substance contemplated by the invention would include hydrocarbon soluble, organo-metallic compounds having a solubility in methanol at room temperature of at least 0.1 gram per liter, illustrative soluble forms of the catalytic materials are the naphthenates, stearates, octoates, carbonyls and the like. Various chelates, association compounds and enol salts, such, for example, as aceto-acetonates may also be used. Specific and preferred catalytic compounds of this type for use in the invention are the naphthenates and carbonyls of molybdenum, vanadium and tungsten.

As to the substrate, olefinically unsaturated materials which are epoxidized in accordance with the invention include substituted and unsubstituted aliphatic and alicyclic olefins which may be hydrocarbons or esters or alcohols or ketones or thers or the like. Preferred compounds are those having from about 2 to 30 carbon atoms, and perferably at least 3 carbon atoms. Illustrative olefins are ethelene, propylene, normal butylene, isobutylene, the pentenes, the methyl pentenes, the normal hexenes, the octenes, the dodecenes, cyclohexene, methyl cyclohexene, butadiene, styrene, methyl styrene, vinyl toluene, vinyl cycloxerene, the phenyl cyclohexenes, and the like. Olefins having halogen, oxygen, sulfur and the like containing substituents can be used. Such substituted olefins are illustrated by allyl alcohol, methallyl alcohol, cyclohexanol, dially ether, methyl methacrylate, methyl oleate, methyl vinyl ketone, allyl chloride, and the like. In general, all olefinic materials epoxidized by methods previously employed can be epoxidized in accordance with this process including olefinically unsaturated polymers.

The lower olefins having about 3 or 4 carbon atoms in an aliphatic chain are especially advantageously epoxidized by this process.

In the oxidation of the substrate, the ratio of substrate to organic peroxy compounds can vary over a wide range. Generally, mol ratios of olefinic groups in the substrates to hydroperoxide broadly in the range of 0.5:1 to 100:1, desirably 1:1 to 20:1 and preferably 2:1 to 10:1 are employed.

The concentration of hydroperoxide in the substrate oxidation reaction mixture at the beginning of the reaction will normally be one percent or more although lesser concentrations will be effective and can be used.

Temperatures which can be employed in the epoxidation can vary quite widely. Temperatures broadly in the range $-20$ to $200°$ C., desirably $0-150°$ C. and preferably $50-120°$ C. can be employed. The reaction is carried out at conditions sufficient to maintain the liquid phase. Although sub-atmospheric pressures can be employed, pressures usually in the range of about atmospheric to about 1000 p.s.i.g. are most desirable.

The substrate oxidation reaction can be carried out in the presence of a solvent, and in fact, it is generally desirable that one be used. In general, aqueous solvents are not contemplated. Among the suitable substances are hydrocarbons, which may be aliphatic, naphthenic or aromatic, and the oxygenated derivatives of these hydrocarbons. Preferably, the solvent has the same carbon skeleton as the hydroperoxide used, so as to minimize or avoid solvent separation problems.

Basic substances can be employed in the epoxidation. Suitable substances are alkali metal compounds or alkaline earth metal compounds. Particularly preferred are the compounds of sodium, potassium, lithium, calcium, magnesium, rubidium, cesium, strontium and barium. Compounds which are employed are those which most preferably are soluble in the reaction medium. However, insoluble forms can be employed and are effective when dispersed in the reaction medium. Organic acid compounds such as a metal acetate, naphthenate, stearate, octoate, butyrate, and the like can be employed. Additionally inorganic salts such as Na carbonate, Mg carbonate, trisodium phosphate, and the like can also be employed. Particularly preferred species of metal salts include sodium naphthenate, potassium, stearate, magnesium carbonate, and the like. Hydroxides and oxides of alkali and alkali earth metal compounds can be used. Examples are NaOH, MgO, CaO, Ca(OH)$_2$, KO, and the like, alkoxides, e.g. Na ethylate, K cumylate, Na phenate etc. can be used. Amides such as NaNH$_2$ can be used as can quaternary ammonium salts. In general, any compounds of alkali or alkali earth metals giving a basic reaction in water can be used.

The compound is employed during the epoxidation reaction in amount of .05 to 10 mols/mol of epoxidation catalyst, desirably .25 to 3.0 and preferably .50 to 1.50. It has been found that as a result of the incorporation of the basic compound in the reaction system, significantly improved efficiencies in the utilization of the organic hydroperoxides in the epoxidation are achieved.

The epoxidation effluent is desirably treated for the separation of the various components. Suitably the mixture is distilled in order to separate an oxirane compound product as well as the tetralol product. This latter product is then subjected to further reaction to produce an additional valuable chemical.

In preferred practice of the invention, the tetralol from the epoxidation effluent is oxidized with molecular oxygen in the vapor phase to produce phthalic anhydride. The conditions which are employed in this oxidation are much the same as those which have previously been employed in processes for the oxidation of naphthalene to phthalic anhydride. This oxidation may involve the use of a vanadium pentoxide catalyst, usually on a suitable support. Co, Mo, Cu and other known oxidation metals are suitably used also. Air is the preferred source of molecular oxygen although oxygen alone or various concentration in inert gas can also be employed. Suitable temperatures range from about $300°$ to $650°$ C., with $400°$ to $500°$ C. being preferred. The pressure is normally about atmospheric although pressures in the range 0 to 500 p.s.i.g. are generally suitable. It is preferred to employ a large molar excess of molecular oxygen in carrying out the reaction. A range of about 10–150:1 mols air per mol tetralol is preferred.

The product phthalic anhydride is recovered in accordance with generally known techniques such as are described in U.S. Patent 3,084,914.

The yield of phthalic anhydride which is obtained from tetralol is significantly improved as compared with yields obtainable from Tetralin. Normally, yield improvements ranging from 5 to 15% are achieved using tetralol as contrasted with Tetralin. Thus, the outstanding and advantageous nature of the invention can be seen.

In a somewhat lass preferred although quite valuable embodiment of the invention, the product tetralol is dehydrogenated to the important chemical alpha naphtol. The dehydrogenation is carried out preferably in the presence of hydrogen, and at temperatures ranging from about $250°$ C. to $475°$ C. and pressures between about 100 mm. and 3 atmospheres. More desirably temperatures are $325°$ C. to $400°$ C. with $375°$ C. at atmospheric pressure being especially preferred.

The liquid hourly space velocity of the charge mixture to the dehydrogenation is broadly 0.3 to 2.5, desirably 0.6 to 1 preferably 0.7 to 0.8. The mol ratio of hydrogen is in the range of 1 to 15 and desirably 4 to 8 mols of hydrogen per mol of tetralol.

The preferred dehydrogenation catalyst is platinum on carbon wherein the catalyst comprises about 0.5 to 5% by weight platinum on carbon. However, other dehydrogenation catalysts including nickel, palladium, cobalt, copper, chromium, zinc, and the like can be employed.

The conversion of the tetralol to alpha naphthol is maintained at about 50 to 100% and preferably at least 75% per pass.

The following examples illustrate the invention:

EXAMPLE I

Tetralin in the liquid phase is oxidized with air at a temperature of $115°$ C. and atmospheric pressure. The oxidation is continued until about 35% of the Tetralin is reacted. The molar selectivity to Tetralin hydroperoxide is 85%.

About 39.3 grams of Tetralin oxidate containing 33 weight percent Tetralin alpha hydroperoxide are admixed with about 0.4 gram of molybdenum naphthenate (5 wt. percent Mo), 51.5 grams of propylene and 11.0 grams of tertiary butyl alcohol. The reaction is run at 90° C. in a closed pressure autoclave. The reaction time is 1 hour.

Conversion was 89.4% based on hydroperoxide and selectivity to propylene oxide was 45.7%. The selectivity to tetralol was 85% based on converted hydroperoxide.

The reaction mixture was distilled and propylene oxide recovered overhead.

The bottom fraction from the distillation containing Tetralin and tetralol which was formed, both in the peroxidation and as a result of reduction of the hydroperoxide, was distilled and the overhead Tetralin product was condensed and returned to the peroxidation step. The bottoms tetralol fraction was vaporized, mixed with air to a mixture comprising the volume 1.5% tetralol and passed over a vanadium pentoxide on alumina (5% vanadium pentoxide) catalyst at 400° C., 18 p.s.i.g., and 2000 space velocity, hours$^{-1}$.

The reaction effluent is condensed in order to separate phthalic anhydride from various other gaseous products. The yield of phthalic anhydride is 97 mol percent based on tetralol. Tetralol conversion during the above oxidation is substantially completed.

EXAMPLE II

Example I is repeated except that the bottoms tetralol fraction, instead of being oxidized to phthalic anhydride is converted to alpha naphthol. The bottoms tetralol fraction is vaporized, admixed with hydrogen, and passed over a 2% platinum in carbon dehydrogenation catalyst at 375° C. and 0 p.s.i.g. The liquid space velocity is 0.7. About 5 mols hydrogen are used per mol tetralol.

Conversion of tetralol is 95% and the molar selectivity to alpha naphthol is 93%.

EXAMPLE III

Example I is repeated using vanadium naphthenate in equivalent mol amount as epoxidation catalyst. Similar results are achieved.

EXAMPLE IV

Example I is repeated using tetrabutyl titanate in equivalent molar amount as epoxidation catalyst. Similar results are achieved.

EXAMPLE V

Example I is repeated using tungsten carbonyl in equivalent molar amount as epoxidation catalyst. Similar results are achieved.

EXAMPLE VI

Example I is repeated using tantalum naphthenate in equivalent molar amount as epoxidation catalyst. Similar results are achieved.

EXAMPLE VII

Example I is repeated using niobium naphthenate in equivalent molar amount as epoxidation catalyst. Similar results are achieved.

EXAMPLE VIII

Example I is repeated using rhenium heptoxide in equivalent molar amounts as epoxidation catalyst. Similar results are achieved.

EXAMPLE IX

Example I is repeated using selenium naphthenate in equivalent molar amounts as epoxidation catalyst. Similar results are achieved.

What is claimed is:

1. In a process for the preparation of phthalic anhydride, the steps of reacting Tetralin hydroperoxide and a substituted or unsubstituted lower olefin having 3 to 4 carbon atoms in the liquid phase at a temperature in the range $-20$ to 200° C. and in the presence of a titanium, vanadium, chromium, selenium, zirconium, columbium, molybdenum, tellurium, tantalum, tungsten, rhenium or uranium catalyst to form an oxirane compound and an alpha tetralol and oxidizing said alpha tetralol in the vapor phase with molecular oxygen in the presence of a vanadium pentoxide catalyst at a temperature in the range 300–650° C. to phthalic anhydride.

2. The process of claim 1 wherein the lower olefin is propylene.

3. The process of claim 1 wherein the catalyst is vanadium, tungsten, molybdenum, titanium, tantalum, columbium, rhenium or selenium.

4. The process of claim 1 wherein the catalyst is molybdenum.

5. The process of claim 1 wherein the catalyst is vanadium.

6. The process of claim 1 wherein the catalyst is tungsten.

7. The process of claim 1 wherein the catalyst is titanium.

8. The process of claim 1 wherein the catalyst is tantalum.

References Cited

UNITED STATES PATENTS 1,936,427  11/1933  Forrest et al. _____ 260—346.4

ALEX MAZEL, Primary Examiner

BERNARD I. DENTZ, Assistant Examiner

U.S. Cl. X.R.

260—348.5